(12) United States Patent
Grudzinski

(10) Patent No.: US 6,549,618 B1
(45) Date of Patent: Apr. 15, 2003

(54) PAY TELEPHONE VAULT GUARD

(75) Inventor: David E. Grudzinski, 1 Windsong La., Friendswood, TX (US) 77546

(73) Assignee: David E. Grudzinski, Houston, TX (US)

( * ) Notice: Subject to any disclaimer, the term of this patent is extended or adjusted under 35 U.S.C. 154(b) by 0 days.

(21) Appl. No.: 09/290,525

(22) Filed: Apr. 12, 1999

(51) Int. Cl.[7] .................. H04M 1/00; H04M 17/00; G07B 15/00
(52) U.S. Cl. .................. 379/145; 379/453; 294/15; 294/16; 294/34
(58) Field of Search .................. 379/145, 437, 379/445, 451, 453; 70/277, 278, 279, 283; 194/350; 453/5; 294/34, 15, 16

(56) References Cited

U.S. PATENT DOCUMENTS

| 3,527,176 | A |   | 9/1970  | Losapio |
|---|---|---|---|---|
| 3,884,515 | A | * | 5/1975  | Ashkenazi ............... 292/34 |
| 4,133,419 | A |   | 1/1979  | Greenwald et al. .......... 194/1 |
| 5,038,908 | A | * | 8/1991  | McGough ................ 194/350 |
| 5,058,966 | A |   | 10/1991 | McGough ................ 312/319 |
| 5,131,035 | A | * | 7/1992  | Ohayon .................. 379/437 |
| 5,155,765 | A |   | 10/1992 | McGough ................ 379/437 |
| 5,385,225 | A |   | 1/1995  | Chen et al. ............... 194/350 |
| 5,402,476 | A |   | 3/1995  | Ohayon .................. 379/145 |
| 5,509,057 | A |   | 4/1996  | Anello et al. ............. 379/145 |
| 5,818,917 | A |   | 10/1998 | Anello et al. ............. 379/145 |
| 6,038,298 | A | * | 3/2000  | Cheng ................... 379/143 |
| 6,047,065 | A | * | 4/2000  | McGough ................ 379/451 |
| 6,098,875 | A | * | 8/2000  | Cheng et al. ............... 232/15 |
| 6,275,584 | B1 | * | 8/2001 | McGough ................ 379/453 |

* cited by examiner

Primary Examiner—Binh Tieu
(74) Attorney, Agent, or Firm—Kenneth A. Keeling; Keeling Hudson LLC

(57) ABSTRACT

A guard for preventing the vandalism of the vault and vault door of a pay telephone, comprising a plurality of rigid segments. Each rigid segment includes an attachment end and a free end, defining a perpendicular distance therebetween. Each of the rigid segments is attached at its attachment end to the lower housing of the pay telephone immediately adjacent and substantially surrounding the vault door. In the preferred embodiment, the plurality of rigid segments comprise one integral rigid member. The guard changes the leverage point of the pry bar of a vandal so as to prohibit such vandal from forceably removing the vault door. The leverage point is changed from proximate the vault door to the free end of a rigid segment or integral rigid member.

10 Claims, 3 Drawing Sheets

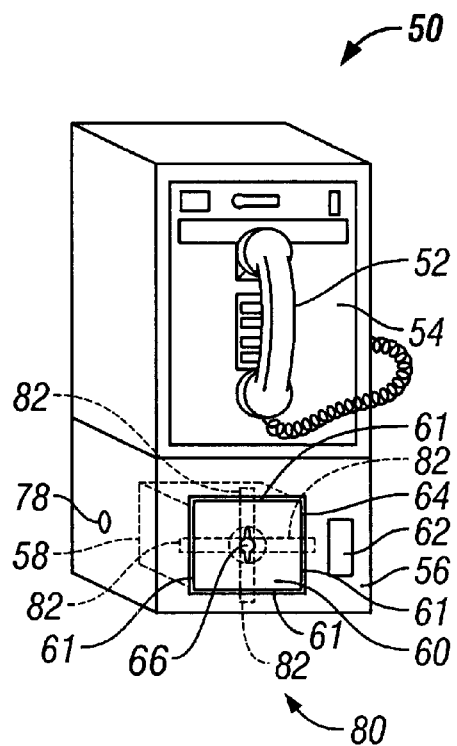
FIG. 1
*(Prior Art)*
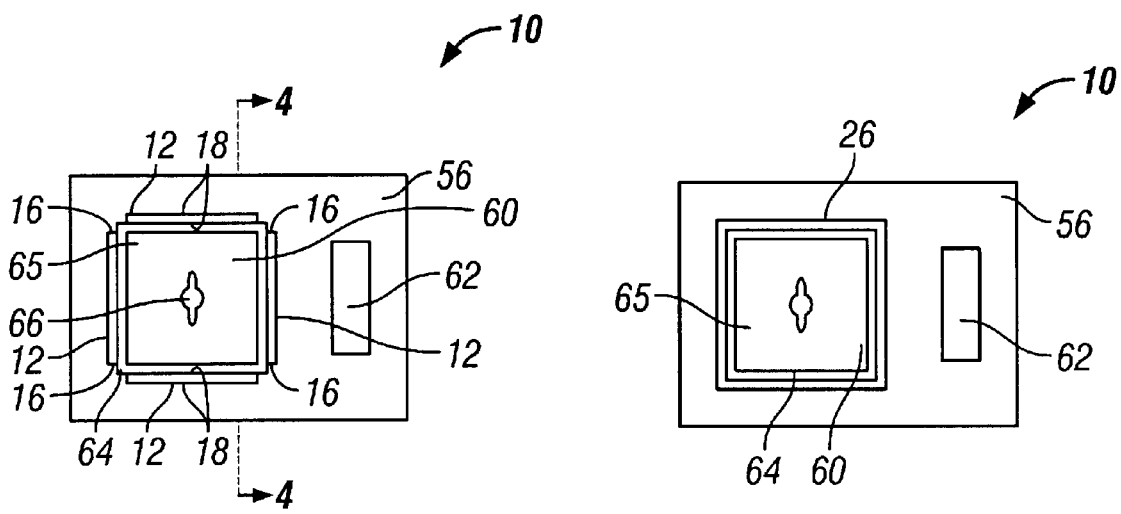
FIG. 2          FIG. 3

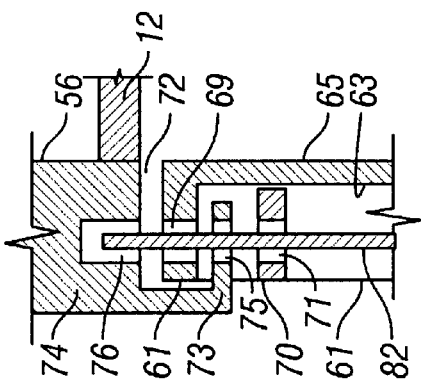
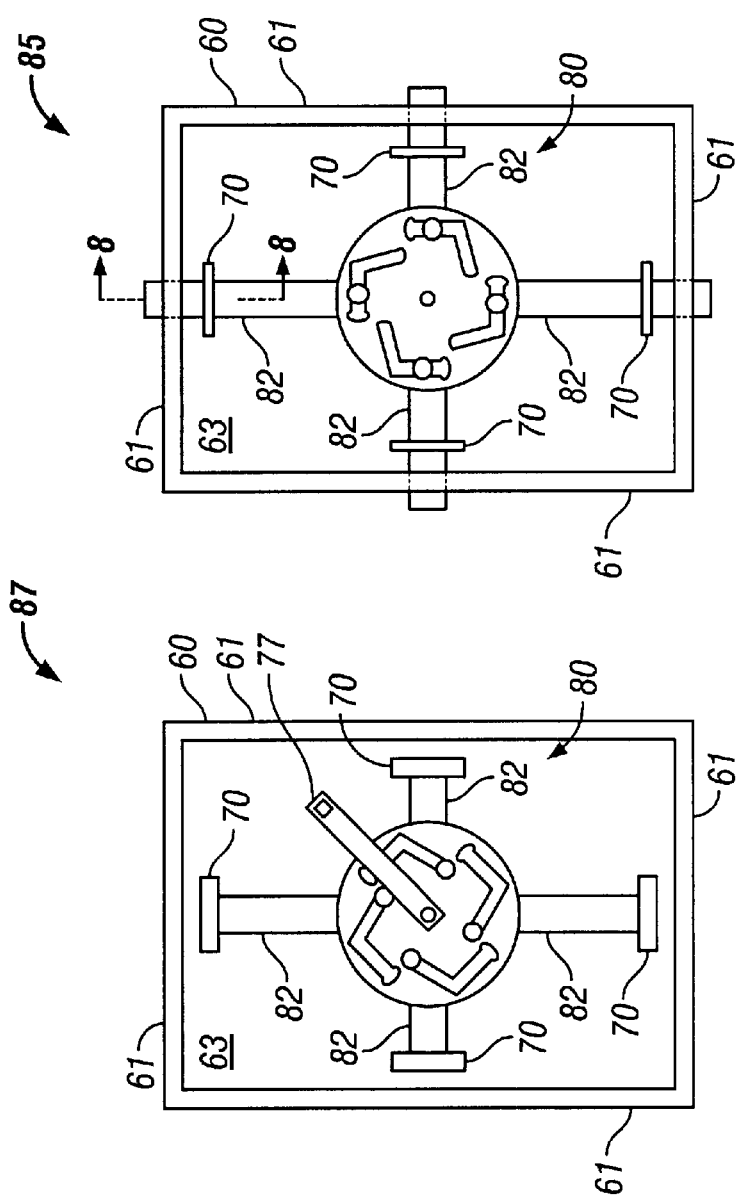
FIG. 8
FIG. 7
FIG. 6

PAY TELEPHONE VAULT GUARD

BACKGROUND OF THE INVENTION

1. Field of Invention

This invention relates generally to a guard that prevents the destruction and vandalism of the vault of a pay telephone. Specifically, this invention is a vault guard that prevents the vandalism of a pay telephone vault by prohibiting a potential vandal from gaining the leverage necessary to pry out the door of the vault.

Over a prolonged period of time, a large amount of coin money is retained within the vault of a pay telephone. Due to their normally isolated and unprotected location, pay telephones are the subject of frequent vandalism attempts. Vandals use a variety of means to gain access to the pay telephone vaults, including drilling through the telephone housing and/or detonating an explosion on the pay telephone lower housing.

A large percentage of vandals also attempt to forceably pry the vault door from the lower housing of the pay telephone so as to access the coin money within the telephone vault. Vandals typically insert a pry bar into the gap between the vault door and the lower housing and exert an outward force in the direction normal to the pay telephone. The outward force exerted by the pry bar shears or bends the locking mechanism of the vault door thereby removing the vault door and leaving the vault open for the vandal. The present invention is concerned with preventing this last type of vandalism, namely the removal of a pay telephone vault door by use of a pry bar.

2. Related Art

Several inventions aimed to prevent the vandalism of pay telephone vaults are known to the prior art. Illustrative of such inventions are U.S. Pat. No. 5,155,765 issued to McGough; U.S. Pat. No. 5,402,476 issued to Ohayon; U.S. Pat. No. 5,509,057 issued to Anello et al.; and U.S. Pat. No. 5,818,917 issued to Anello et al.

The Ohayon '476 Patent teaches a two-part armor, one part for the upper housing and one part for the lower housing. The lower housing armor part includes an opening for the vault door and an opening for the coin return box. The lower housing armor also includes a removable plate that is attached to the vault door. Likewise, the '765 Patent discloses a lower housing armor having one armored element that is attached to the vault door. The Anello '057 Patent and the Anello '917 Patent teach one part and two part armors, respectively, that completely cover the pay telephone vault door.

These patents are exemplary of the typical telephone armors currently placed on a large number of pay telephones. Some of these armors, although making the overall pay telephone structure much more rigid and sturdy, still allow a vandal to insert a pry bar into the gap between the vault door and the lower housing and exert a force which removes the vault door from the lower housing. In addition, all of these armors are constructed from a substantial quantity of metal material and are thus relatively expensive and time-consuming to manufacture.

It would thus be beneficial to the prior art to provide a vault guard that prevents a vandal from prying out the vault door from the lower housing of a pay telephone.

The prior art would also benefit from a vault guard that is relatively inexpensive and simple to manufacture.

The pay telephone armors described herein are also somewhat difficult to install. Some of the armors include a plurality of interfitting parts. Other armors require that some of the parts of the pay telephone first be disassembled (such as the receiver, etc.) prior to the installation of the actual armor. The actual armor then fits between such parts and the lower housing of the pay telephone.

Therefore, it would be beneficial to the prior art to provide a vault guard that can be installed quickly and easily.

SUMMARY OF THE INVENTION

Accordingly, the objectives of this invention are to provide, inter alia, a new and improved pay telephone vault guard that:

prevents a vandal from prying out the vault door from the lower housing of a pay telephone;

is relatively inexpensive and simple to manufacture; and can be installed quickly and easily.

Other objects of the invention will become apparent from time to time throughout the specification hereinafter disclosed.

To achieve such improvements, my inventions is a guard for preventing the vandalism of the vault and vault door of a pay telephone, comprising a plurality of rigid segments. Each rigid segment includes an attachment end and a free end, defining a perpendicular distance therebetween. Each of the rigid segments is attached at its attachment end to the lower housing of the pay telephone immediately adjacent and substantially surrounding the vault door. In the preferred embodiment, the plurality of rigid segments comprise one integral rigid member. The guard changes the leverage point of the pry bar of a vandal so as to prohibit such vandal from forceably removing the vault door. The leverage point is changed from proximate the vault door to the free end of a rigid segment or integral rigid member.

BRIEF DESCRIPTION OF THE DRAWINGS

FIG. 1 is an isometric view of a prior art pay telephone.

FIG. 2 is a front view of a first embodiment of the invention.

FIG. 3 is a front view of a second embodiment of the invention

FIG. 6 is a rear view of the vault door in the unlocked state.

FIG. 7 is a rear view of the vault door in the locked state.

FIG. 8 is a cross-sectional view taken along line 8—8 of FIG. 7 showing the vault door attached to the lower housing.

DETAILED DESCRIPTION OF THE INVENTION

Figure 4:
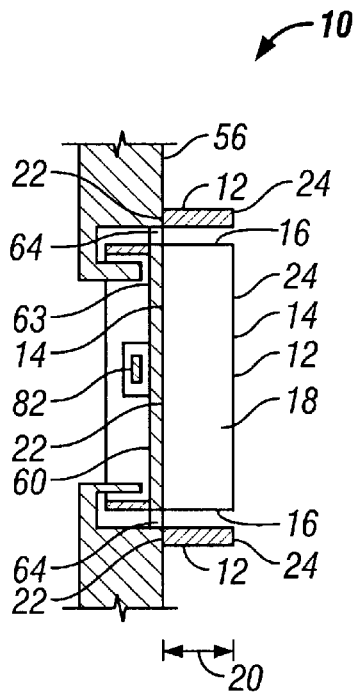
FIG. 4 is a cross-sectional view taken along line 4—4 of FIG. 2.

The vault guard is shown in FIGS. 1–8 generally as 10. FIG. 1 illustrates a prior art pay telephone 50. Pay telephone 50 includes a receiver 52, an upper housing 54, and a lower housing 56. Lower housing 56 accommodates a vault 58, a vault door 60, and a return coin slot 62.

Any coins deposited by users into the pay telephone 50 are stored within vault 58 unless they return to the user via the return coin slot 62. Vault door 60 encloses vault 58 thereby safeguarding the coins therein. Vault door 60 is typically substantially flush with lower housing 56. A gap 64 is defined between vault door 60 and lower housing 56. Typically, gap 64 is between $\frac{1}{32}$ to $\frac{1}{16}$ inch all around. Vault door 60 and vault 58 are both removable from lower housing 56. Vault door 60 may also be locked thereby preventing thieves from taking the coins located within vault 58.

Vault door 60 normally includes a front surface 65, a rear surface 63, and a plurality of sides 61. In the preferred embodiment, each vault door side 61 is perpendicular to front surface 65. Vault door 60 normally includes a key slot 66 from front surface 65 through rear surface 63. In addition, as seen in FIGS. 6 and 7, vault door 60 is typically attached to the remainder of the pay telephone 50 by way of a 4-way latch mechanism 80 that includes four latches 82. The latches 82 are located on the rear surface 63 of vault door 60. Although vault door 60 can theoretically be any shape, vault door 60 is normally rectangular in shape, including four vault door sides 61. In a rectangular shaped vault door 60, one latch 82 corresponds to each of the four vault door sides 61.

Latch mechanism 80 includes an extended position as shown in FIG. 7 and a retracted position as shown in FIG. 6. Latch mechanism 80 can be moved to and from the extended and retracted positions by inserting the key that corresponds to the key slot 66 into the key slot 66 and turning the key therein.

In the extended position, each latch 82 protrudes through a hole 71 in its corresponding bracket 70 and through an opening 69 on each corresponding vault door side 61. In the retracted position, each latch 82 is retracted towards the center of the vault door rear 63 so that none of the latches 82 protrude from the vault door sides 61. The extended position corresponds to the locked state 85 of vault 58 and vault door 60, whereas the retracted position corresponds to the unlocked state 87 of vault 58 and vault door 60.

The locked state 85 of vault 58 and vault door 60 is further defined by the vault door 60 being in place on top of vault 58 and with front surface 65 being flush with lower housing 56. In addition, in the locked state 85, each side 61 of vault door 60 fits into channel 72 of lower housing 56. Thus, each side 61 is intermediate first channel member 73 and second channel member 74. The cross-sectional view of one latch 82 in the locked state 85 is shown in FIG. 8. As can be seen, latch 82 protrudes through a hole 71 in its corresponding bracket 70, through a first channel member opening 75, through a side opening 69, and into a second channel member slot 76. Thus, with a section of each latch 82 situated through each of the relevant segments, vault door 60 is secured in place. A further locking mechanism, of which locking bar 77 is a part (shown in FIG. 6 but not FIG. 7), thereafter is activated through side key hole 78 to lock latches 82 in place and thereby secure the contents of vault 58.

As previously mentioned, in order to remove vault 58 from pay telephone 50, vandals typically insert a pry bar into gap 64 and exert an outward force in a direction substantially normal to pay telephone 50 to first remove vault door 60 from pay telephone 50. The direction of the force exerted by the pry bar is important in the removal of vault door 60. Only a force in a direction substantially normal to pay telephone 50 will shear or bend enough of the latches 82 to allow the removal of vault door 60. If instead the force is directed towards one of the vault door sides 61, then vault door 60 will not be removed because such force would not bend or shear each of the latches 82 and would simply jam the relevant side 61 against the lower housing 56.

Vault guard 10 prohibits a vandal from being able to exert an outwardly prying force to vault door 60. As shown in FIGS. 2 and 4, vault guard 10 generally comprises a plurality of rigid segments 12 fixedly attached to lower housing 56 and at least substantially surrounding vault door 60 and gap 64.

Each rigid segment 12 is preferably constructed from a strong and durable material. Acceptable materials include a variety of metals, such as stainless steel. In the preferred embodiment, each rigid segment 12 is constructed from stainless steel flat bar.

Each rigid segment 12 is preferably elongate in shape and includes two transverse ends 14, two longitudinal ends 16, and two lateral sides 18. Preferably, the two lateral sides 18 are parallel to each other, the two transverse ends 14 are parallel to each other, and the two longitudinal ends 16 are parallel to each other. A perpendicular distance 20 is defined between the transverse ends 14 wherein the perpendicular distance 20 is essentially the dimensional width of each of the two lateral sides 18.

Each rigid segment 12 is attached to lower housing 56 at one of its transverse ends 14, hereinafter referred to as attachment end 22. Preferably, each rigid segment 12 is attached at its attachment end 22 directly adjacent to gap 64. Also preferably, rigid segment 12 does not extend over gap 64 thereby allowing vault door 60 and vault 58 to be removed from lower housing 56. Each rigid segment 12 is fixedly attached to lower housing 56 by means well-known in the art, such as welding.

The other transverse end 14 (not attachment end 22) is hereinafter defined as free end 24. Thus, perpendicular distance 20 can also be defined as the distance extending between attachment end 22 and free end 24. Perpendicular distance 20 is preferably at least one inch long. It has been discovered through experimentation that a perpendicular distance 20 of two inches provides sufficient clearance from lower housing 56 to enable the functionality of vault guard 10.

The plurality of rigid segments 12 are attached to lower housing 56 so as to at least substantially surround vault door 60 and gap 64. Any spacial distance defined between the longitudinal ends 16 of adjacent rigid segments 12 should be small enough to prohibit a pry bar from being inserted therein. In the embodiment in which vault door 60 is rectangular in shape, the plurality of rigid segments 12 comprise four rigid segments 12. Each of the four rigid segments 12 correspond and are adjacent to one of the four vault door sides 61.

Figure 5:
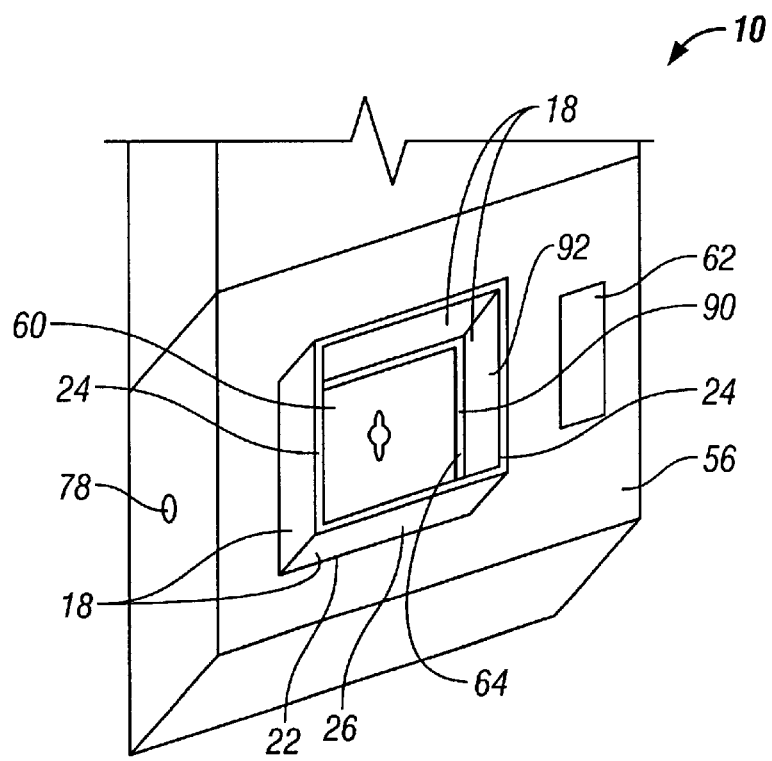
FIG. 5 is an isometric view of one embodiment of the invention.

In the preferred embodiment as shown in FIGS. 3 and 5, the plurality of rigid segments 12 comprise one integral member 26. In this embodiment, either each of the plurality of rigid segments 12 can be joined together (such as by welding) to form the integral member 26 or one sufficiently long rigid segment 12 can be bent into the appropriate shape and joined together (such as by welding) at its longitudinal ends 16 to form the integral member 26. In this embodiment, vault guard 10 completely surrounds vault door 60 and gap 64. Thus, for example, in the embodiment in which vault door 60 is rectangular in shape, the four rigid segments 12 are joined together to form integral member 26, which is also rectangular in shape.

IN OPERATION

Vault guard 10 is, as previously disclosed, fixedly attached to lower housing 56 so as to at least substantially surround vault door 60 and gap 64. Notably, vault guard 10 does not extend over gap 64 thereby allowing the removal of vault door 60 and vault 58 from lower housing 56 and through vault guard 10. A vandal that wants to vandalize a pay telephone 50 that includes vault guard 10 thereon will not be able to remove vault door 60 and vault 58 by utilizing a pry bar.

As previously disclosed, only a pry force in a direction substantially normal to pay telephone 50 will shear or bend each of the latches 82 to allow the removal of vault door 60. The typical prior art pay telephone 50 allows a pry force in this normal direction because the prior art leverage point 90 (noted in FIG. 5) is located on lower housing 56 and is very close to the point where the force is exerted on vault door 60, namely the rear end of vault door side 61. Due to the inclusion of perpendicular distance 20, a pay telephone 50 with vault guard 10 thereon changes the leverage point of a pry bar to new leverage point 92 located on the free end 24 of one of the rigid segments 12 (or integral member 26), which is a given distance away from the force exertion point on the rear end of the vault door side 61.

Thus, vault guard 10 changes the leverage point of a pry bar from prior art leverage point 90 to new leverage point 92, essentially moving the leverage point the perpendicular distance 20. With the new leverage point 92, a vandal using a pry bar will only be able to exert a force on vault door 60 in the direction of one of the vault door sides 61. As previously disclosed, a force in the direction of one of the vault door sides 61 will not result in the removal of vault door 60.

It should be noted that the perpendicular distance between the two lateral sides 18 of each rigid segment 12 or integral member 26 must be large enough so as to withstand prying attempts by vandals. It is preferred that such distance measure at least ⅛ inch.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

I claim:

1. A guard for preventing the vandalism of the vault and corresponding vault door of a pay telephone, said pay telephone of the type having a lower housing and a lower housing front surface, said lower housing accommodating said vault and vault door, said vault door having a vault door front surface, said guard comprising:

a plurality of rigid segments;

each of said plurality of rigid segments including an attachment end and a free end;

said attachment end and said free end defining a perpendicular distance therebeteen;

each of said plurality of rigid segments fixedly attached at said attachment end to said lower housing and immediately adjacent to said vault door;

said plurality of rigid segments at least substantially surrounding said vault door; and said plurality of rigid segments extending outwardly from said lower housing front surface past said vault door front surface.

2. A guard as in claim 1, wherein said perpendicular distance measures at least one inch.

3. A guard as in claim 1, wherein said plurality of rigid segments are joined to form one integral rigid member.

4. A guard as in claim 1, wherein:

said vault door is rectangular in shape;

said plurality of rigid segments comprise four rigid segments; and one of said four rigid segments adjacent to each of the four sides of said rectangular vault door.

5. A guard as in claim 4, wherein said four rigid segments are joined to form one integral rigid member.

6. In a pay telephone having a lower housing accommodating a vault and corresponding vault door, the combination with said lower housing, said vault and said vault door of a vault guard comprising a plurality of rigid segments, each of said plurality of rigid segments including an attachment end and a free end, said attachment end and said free end defining a perpendicular distance therebetween outwardly from said lower housing, each of said plurality of rigid segments fixedly attached at said attachment end to said lower housing and immediately adjacent to said vault door, so that said plurality of rigid segments at least substantially surround said vault door and move a pry bar leverage point outward from said lower housing and said vault door.

7. A vault guard as in claim 6, wherein said perpendicular distance measuring at least one inch.

8. A vault guard as in claim 6, wherein said plurality of rigid segments are joined to form one integral rigid member.

9. A vault guard as in claim 6, wherein:

said vault door is rectangular in shape;

said plurality of rigid segments comprise four rigid segments; and one of said four rigid segments adjacent to each of the four sides of said rectangular vault door.

10. A vault guard as in claim 9, wherein said four rigid segments are joined to form one integral rigid member.

\* \* \* \* \*